May 31, 1960 G. J. SAXENMEYER 2,939,124

MAGNETIC CORE DETECTION CIRCUIT FOR DOUBLE PUNCH AND BLANK COLUMN

Filed May 6, 1957

INVENTOR.
GEORGE J. SAXENMEYER.
BY
[signature]
AGENT.

2,939,124

MAGNETIC CORE DETECTION CIRCUIT FOR DOUBLE PUNCH AND BLANK COLUMN

George J. Saxenmeyer, Vestal, N.Y., assignor to International Business Machines Corporation, New York, N.Y., a corporation of New York Filed May 6, 1957, Ser. No. 657,148

7 Claims. (Cl. 340—213)

This invention relates broadly to checking circuits and more specifically to a circuit arrangement for detecting blanks and unwanted data designations in data bearing columns or regions of a record, tape, or the like.

The invention resides in the use of magnetic cores in a novel circuit arrangement for detecting the absence of data and/or the presence of more data than is intended in a specified column or region of a data bearing medium.

Although the invention is illustrated in connection with a particular machine controlled by punched records, it may be appreciated that the invention may be utilized in other types of data processing machines processing record media in which the data is manifested in other forms, for example, conductive marks, discrete magnetized spots, photosensitive marks, etc., depending upon the nature of the data sensing mechanisms.

The main object of the invention resides in a circuit arrangement employing magnetic cores for detecting blanks and unwanted data designations in data bearing columns of a record which is faster, more economical to manufacture and requires less space than pertinent devices of the prior art.

Other objects of the invention will be pointed out in the following description and claims and illustrated in the accompanying dawings, which disclose, by way of examples, the principle of the invention and the best mode, which has been contemplated, of applying that principle wherein:

Figure 2:
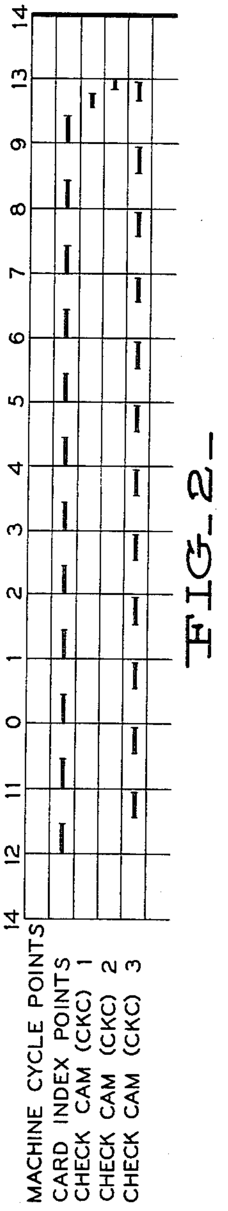
Fig. 2 is a timing chart of the machine.

The invention is incorporated in a machine of the type shown and described in the Patent 2,053,067 issued to J. M. Cunningham on September 1, 1936. This machine is commonly referred to as a reproducing punch and is adapted with two record feeding units, namely, a read unit and a punch unit. Perforated records 1 are normally placed in the reading unit while blank cards are generally placed in the punch unit. In the normal course of operation the reproducing punch, the data read from the records passing through the read unit are punched into the blank records passing through the punch unit. For the purpose of illustrating an application of the invention, the punch unit will be considered but only in a somewhat schematic manner. The records 1 passing therethrough are fed twelve edge 1*a* first, so that the index point data representing positions on the records will correspond to the cycle point timing of the machine. The basic timing cycle of the machine is shown in the timing chart of Fig. 2 of the drawings. At the top of this timing chart it will be seen that the machine cycle is comprised of fourteen points, beginning with point 14, followed by the card index point positions 12—10—0—1 through 9, and point 13.

Figure 1:
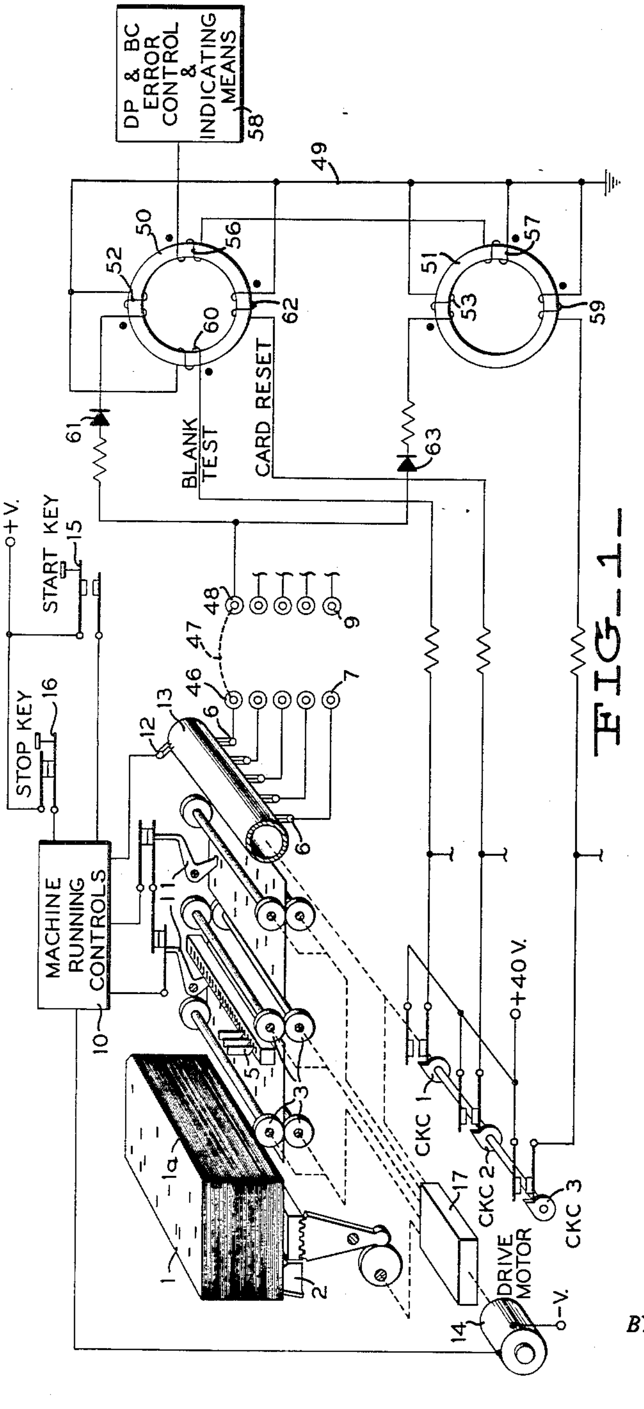
Fig. 1 shows the details of the invention.

Referring to the left side of Fig. 1, there is shown diagrammatically the punch unit which has a stack of records 1 supported in a hopper not shown. A conventional picker knife arrangement 2 is used to feed the records singly to appropriate sets of feed rolls 3 disposed along the path of card travel in the machine. These feed rolls convey the records in succession through a punching station, a reading or checking station and finally into a card receiving stacker, not shown. The punching station is diagrammatically shown as having a single row of punches 5 cooperating with a die, not shown, disposed beneath the path of travel of the cards. The punches are driven by means, not shown, to perforate the records in accordance with data fed into a punch control setup means, not shown. In the normal course of operation of the machine, this data is usually sensed from the perforated records passing through the read unit of the reproducing machine.

The reading or checking station comprises a line of 80 sensing brushes 6 of which only a few are shown. These brushes terminate in plug sockets 47 to which plug wires 48 are connected, the opposite ends of which are connected to plug sockets 49 forming inputs to the circuit checking means constituting a part of the invention.

As further seen in Fig. 1, the punch unit is provided with machine running controls 10, in block form, connected to card lever contacts operated upon by the well known card levers 11 in turn disposed to cooperate with the records passing through the machine. These machine running control circuits include circuits of a preparatory nature which control the machine during run-in and run-out operations. At appropriate times in each machine cycle a common brush 12 cooperating with the contact roll 13 energizes the latter so as to enable timed impulses to be provided at the sensing brush sockets 7 in response to the sensing of perforations encountered by the sensing brushes 6.

The machine is driven by a drive motor 14 whose control circuits are influenced by the machine running control circuits. Appropriate start 15 and stop keys 16 are provided to initiate and stop operations of the machine. The necessary clutch means, controls therefore and cam contacts are housed in a box referenced as 17.

Checking cam contacts designated CKC1, CKC2 and CKC3, forming part of the invention, are driven by means not shown, connected to the clutch means 17. The timings of these cams are shown in the time chart of Fig. 2.

The invention includes a pair of cores 50, 51 of magnetic material, having essentially rectangular hysteresis characteristics, each core having appropriate windings for setting up or switching, resetting and testing the cores. Cores 50 and 51 each have switching windings, namely, 52, 53 connected between a grounded line 49 and the plug socket 48, the latter being connected to the plug socket 46 by way of a plug wire 47. Any impulses arising in response to the sensing of a perforation by the associated sensing brush 46 will be transmitted to both setup windings 52 and 53 to set up the associated cores to saturation of a given polarity, i.e., to a forward state.

Both cores 50 and 51 each have a sense winding, namely, 56 and 57. These are connected in series, winding 57 being connected to ground and winding 56 being wired to a double punch (DP) and blank column (BC) error control and indicating means 58. This means 58 may take any form well known in the art to operate appropriate error indicating means and to control the machine to either stop whenever an error signal is received or to enable the machine to continue and mark or offset the record in error.

The sense windings are so connected that when both cores 50 and 51 are simultaneously switched in the same direction, the sense winding outputs cancel each other to provide a net output which is substantially zero. The core 51 is also provided with a reset winding 59 having one end wired to ground and the opposite end connected to a positive voltage by way of contacts CKC3 which, according to the time chart, makes in the spaces, or intervals, between the card index times 12 through 9 and 13. The winding 59 when energized switches the core 51 in a reverse direction which is opposite to that attained by the core when it is switched by the setup winding 53. Thus after each of the indicated card index point times of the cycle, winding 59 is energized to reverse the status of the core 51 if it had been previously switched during the early portion of the same card index point as a consequence to the sensing of a perforation by the appropriate sensing brush. It may be appreciated that for each perforation encountered, the appropriate core is switched or set up in one direction after which, and under control of contacts CKC3 and winding 59, the status of the core is switched to a reverse direction. Thereafter during the same cycle the operation of setting up and reversing the core status is repeated as often as succeeding preforations are sensed. In the absence of a perforation, it will be appreciated that only the winding 59 is effective to maintain the core 51 in a reverse state of saturation. For double punch detection, it may be seen that after the first perforation is encountered by the appropriate sensing brush, both cores are switched in consequence thereof in the same direction, under control of windings 52 and 53. Immediately thereafter in the same cycle point winding 59 becomes effective to reverse the status of core 51. Thus at the end of the cycle point in question, core 50 is in one direction of saturation while core 51 is in a reverse direction of saturation.

During the setting up of both cores, sense windings 56 and 57 provide no output to the error means 58. During the reverse switching of core 51, sense winding 57 is effective to provide an output which has no effect on the error means 58. When the second perforation is encountered, both windings 52 and 53 are again energized as before but with no effect on core 50, since it had been previously switched. Core 51, however, is switched and this time sense winding 57 alone provides an error output to the error means 58.

For blank column detection, core 50 is provided with a blank test winding 60 having one end grounded and its opposite end connected to a circuit controlled by contacts CKC1 which operates in the cycle point time after card sensing, i.e., between the points 9 and 13 indicated in the time chart. Thus during a cycle in which no perforation is sensed, cores 50 and 51 will not have been set up as a consequence of this condition. In the interval between points 9 and 13, contacts CKC1 close to energize winding 60 thereby switching the core 50. Sense winding 56 accordingly provides an error output signal in response to the switching of core 50 to provide the error means 58 with an appropriate error signal.

The core 50 is further provided with a reset winding 62 having one end grounded and the opposite end thereof wired to a circuit path controlled by contacts CKC2, which according to the time chart makes shortly before point 13 of the cycle to switch the core back to a reset, or reverse, state thereby enabling the core to be used in preparation for another succeeding operation.

Elements 61 and 63 are diodes for electrically decoupling windings 52 and 53 during the time that windings 59, 60 and 62 are being excited. This prevents spurious magnetic effects in the cores 50 and 51. Also each circuit includes resistor elements for current limiting purposes.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims:

What is claimed is:

1. An arrangement for detecting unwanted data designations in columns of spaced data receiving index positions of records, or the like, in which a data character designation is effected in but one of the index positions of each column comprising: means for sensing the index positions in succession to determine the presence of data designations; first and second cores, having essentially rectangular hysteresis characteristics, each settable to either a forward state or a reverse state; setup windings, one on each core, adapted to switch both cores substantially simultaneously to a forward state in response to the sensing of the first data designation in a column; a reset winding on the second core including means for energizing the same in a reverse direction, during the spaces intermediate the index positions, to switch the associated core in the event the latter had been in a forward state; and sense windings, one on each core, adapted to issue an output signal while only one of the cores is being switched to a forward state.

2. An arrangement for detecting unwanted data designations in columns of spaced data receiving index positions of records, or the like, in which a data character designation is effected in but one of the index positions of each column comprising: means for sensing the index positions in succession to determine the presence of data designations; first and second cores, having essentially rectangular hysteresis characteristics, each settable to either a forward state or a reverse state; setup windings, one on each core, connected in parallel and adapted to switch both cores substantially simultaneously to a forward state in response to the sensing of the first data designation in a column; a reset winding on the second core including means for energizing the same in a reverse direction, during the spaces intermediate the index positions, to switch the associated core in the event the latter had been in a forward state; and sense windings, one on each core, connected in series and adapted to issue an output signal while only one of the cores is being switched to a forward state.

3. An arrangement for detecting blanks and unwanted data designations in columns of spaced data receiving index positions of records, or the like, in which a data character designation is effected in but one of the index positions of each column comprising: means for sensing the index positions in succession to determine the presence of data designations; first and second cores, having essentially rectangular hysteresis characteristics, each settable to either a forward state or a reverse state; setup windings, one on each core, connected in parallel and adapted to switch both cores substantially simultaneously to a forward state in response to the sensing of the first data designation in a column; a reset winding on the second core including means for energizing the same in a reverse direction, during the spaces intermediate the index positions, to switch the associated core in the event the latter had been in a forward state; a blank column test winding on said first core including means for energizing said winding to switch said first core to a forward state at the end of the sensing operation; and sense windings, one on each core, connected in series and adapted to issue an output signal while only one of the cores is being switched to a forward state.

4. An arrangement for detecting blanks and unwanted data designations in columns of spaced data receiving index positions of each column of a record, or the like, in which a data character is effected in but one of the index positions of each column comprising: means for sensing the index positions in succession to determine the presence of data designations; first and second devices, each settable to either a first state or a second state; setup control means for each device and each adapted to set its associated device to a first state in response to the sensing of the first data designation in a column; a reset control means for the second device and operable during the spaces intermediate the index positions to set said second device to a second state in the event the latter had been in a first state; blank column means for said first device and operable to set said first device at the end of a sensing operation; and output control means, one for each device, adapted to provide an output manifestation only while either the first device or the second device, but not both, is being set to a first state.

5. An arrangement for detecting unwanted data designations in columns of spaced data receiving index positions of each column of a record, or the like, in which a data character is effected in but one of the index positions of each column comprising: means for sensing the index positions in succession to determine the presence of data designations; first and second devices, each settable to either a first state or a second state; setup control means for each device and each adapted to set its associated device to a first state in response to the sensing of the first data designated in a column; a reset control means for the second device and operable during the spaces intermediate the index positions to set said second device to a second state in the event the latter had been in a first state; and output control means, one for each device, adapted to provide an output manifestation only while the second device is being set to a first state.

6. A detection circuit for use in a machine controlled by data bearing records, or the like, having columns of spaced index character representing positions and in each column of which a character is represented by a manifestation in a single index position but may have another unwanted manifestation in another index position, or may contain no manifestation in the columns in the event of a missing character, comprising: means for sensing the index character positions in succession to determine the presence of data manifestations or the absence thereof; a pair of cores, having essentially rectangular hysteresis characteristics, each settable either to a forward or a reverse state of saturation; setup windings, one for each core, connected in parallel and adapted to switch both cores to their forward states in response to the first detection of an index manifestation in each detection operation; a reset winding on one core of said pair of cores including control means for energizing said winding in a reverse direction during the spaces between the record index points to cause said one core to switch to a reverse state if the status of the core permits of such switching; a reset control winding on the other core of said pair of cores including means for energizing said reset control winding to switch said other core to a reverse state near the end of each detection operation; a blank column test winding on said other core including control means for energizing said test winding to switch said other core to a forward state near the end of each detection operation; and sense windings, one on each core, connected in series and adapted to provide an output signal only when either one or the other of said cores, but not both, is being switched in a forward direction.

7. A detection circuit for use in a machine controlled by data bearing records, or the like, having columns of spaced index character representing positions and in each column of which a character is represented by a manifestation in a single index position but may have another unwanted manifestation in another index position, or may contain no manifestation in the columns in the event of a missing character, comprising: means for sensing the index character positions in succession to determine the presence of data manifestations or the absence thereof; a pair of cores, having essentially rectangular hysteresis characteristics, each settable either to a forward or a reverse state of saturation; setup windings, one for each core, connected in parallel and adapted to switch both cores to their forward states in response to the first detection of an index manifestation in each detection operation; a reset winding on one core of said pair of cores including control means for energizing said winding in a reverse direction during the spaces between the record index points to cause said one core to switch to a reverse state if the status of the core permits of such switching; a reset control winding on the other core of said pair of cores including means for energizing said reset control winding to switch said other core to a reverse state near the end of each detection operation; a blank column test winding on said other core including control means for energizing said test winding to switch said other core to a forward state near the end of each detection operation; and sense windings, one on each core, connected in a manner to provide an output signal only when either one or the other of said cores, but not both, is being switched in a forward direction.

References Cited in the file of this patent

UNITED STATES PATENTS

| | | |
|---|---|---|
| 2,682,573 | Hunt | June 29, 1954 |
| 2,719,962 | Karnough | Oct. 4, 1955 |
| 2,750,580 | Rabends et al. | June 12, 1956 |
| 2,774,429 | Rabends | Dec. 18, 1956 |